United States Patent [19]

Yamauchi et al.

[11] Patent Number: 5,053,201
[45] Date of Patent: Oct. 1, 1991

[54] PROCESS AND APPARATUS FOR PREPARATION OF POLYESTERS

[75] Inventors: Shinichi Yamauchi, Matsuyama; Katsushi Sasaki, Tokyo; Eiji Matsumura, Iwakuni; Yasuhiko Saito; Takashi Kishida, both of Matsuyama, all of Japan

[73] Assignee: Teijin Limited, Osaka, Japan

[21] Appl. No.: 904,180

[22] Filed: Sep. 5, 1986

[30] Foreign Application Priority Data

Sep. 17, 1985 [JP] Japan .................... 60-203465
Sep. 27, 1985 [JP] Japan .................... 60-146554[U]
Dec. 4, 1985 [JP] Japan .................... 60-271311

[51] Int. Cl.⁵ ............................................. C08F 2/00
[52] U.S. Cl. ......................... 422/135; 159/6.7; 159/13.1; 366/287; 366/288; 422/225; 422/229
[58] Field of Search ............. 422/135, 225, 229; 366/287, 288; 159/6.2, 13.1

[56] References Cited

U.S. PATENT DOCUMENTS

| 3,362,793 | 1/1968 | Massoubre | 366/287 |
| 3,407,046 | 10/1968 | Massoubre | 366/287 |
| 3,746,314 | 7/1973 | Nauta | 366/287 |
| 4,045,185 | 8/1977 | Azemar et al. | 422/135 |
| 4,154,920 | 5/1979 | Jabarin . | |
| 4,383,888 | 5/1983 | Chino et al. | 159/62 |

FOREIGN PATENT DOCUMENTS

| 013240 | 4/1973 | Japan . |
| 123981 | 10/1977 | Japan . |
| 118922 | 9/1980 | Japan . |
| 96627 | 8/1983 | Japan . |
| 1038942 | 8/1066 | United Kingdom . |
| 1227493 | 4/1971 | United Kingdom . |

Primary Examiner—Robert J. Warden
Assistant Examiner—Timothy M. McMahon
Attorney, Agent, or Firm—Burgess, Ryan & Wayne

[57] ABSTRACT

A process and apparatus for the preparation of a polyester, wherein a thin film polymerization apparatus having at least one columnar or cylindrical roller-shaped stirring vane rotating along and in close proximity to a substantially cylindrical vertical tank wall is used, and the stirring vane is caused to make an epicyclic movement along the tank wall in the circumferential direction thereof so that the direction of rotation is the same as the direction of revolution and a polyester-forming monomer and/or an oligomer thereof is dropped on the surface of the tank wall in the form of a thin film.

8 Claims, 6 Drawing Sheets

PROCESS AND APPARATUS FOR PREPARATION OF POLYESTERS

BACKGROUND OF THE INVENTION (1) Field of the Invention

The present invention relates to a process for preparing polyesters, especially polyethylene terephthalate, by continuously carrying out polymerization by using a thin film polymerization apparatus, and also to an apparatus for use in the practice of this process.

(2) Description of the Related Art

Synthetic polyester polymers have excellent physical and chemical properties, and are widely used in various fields. Especially, polyethylene terephthalate has an excellent chemical resistance, heat resistance, insulation resistance, gas barrier property, tenacity, and elasticity modulus and is used in large quantities for textile fibers, industrial fibers, films, containers, and ordinary shaped articles. In order to enjoy greater advantages and reduce production costs, the changeover of batchwise polymerization to continuous polymerization has been tried and advanced. Since the uses of polyesters have been recently diversified, it is now necessary to produce a variety of polymers suitable for respective uses, individually and in small quantities. In order to prepare polymers suitable for diversified uses while utilizing the merits of the continuous polymerization system, the use of a thin film polymerization apparatus having a small capacity is considered advantageous. For example, there have been proposed a process in which a prepolymer from a polymerization vessel at the stage preceding the final stage is fed to at least two final polymerization vessels connected in parallel to each other, a general-purpose polymer is produced in a large quantity by a conventional lateral polymerization reactor, and a special polymer is prepared by an easily exchangeable, small-capacity thin film polymerization reactor (tank), as disclosed, for example, in Japanese Unexamined Patent Publication No. 58-96627, and a process in which monomers and/or oligomers are produced in large quantities, are fed into several lines in parallel at the polymerization steps, one small-capacity thin film polymerization apparatus (tank) or a plurality of such apparatuses connected in series is used in each line, and special polymers are prepared in the respective lines.

The following reaction methods are adopted in this thin film polymerization apparatus.

(1) Stirring vanes are arranged and stirring is carried out at a high speed.

(2) A natural flow-down film is formed by using a wet wall.

(3) A great number of fine filamentary materials are formed to increase the area of the surface for evaporation of volatile by-products.

In the method (1), by forcibly stirring the reaction mixture, the surface of the reaction mixture is renewed and separation of volatile by-products is easily accomplished and a high reaction speed can be obtained, and this method is especially preferred. However, this method is defective in the following points.

(A) Where the apparatus has a central shaft and stirring vanes are attached to this central shaft, the shaft- and stirring vane-attaching portions are not wetted with the polymer and so-called dead spaces are formed, and materials scattered to these dead spaces are converted to gel-like foreign substances with the lapse of time.

(B) When stirring vanes are arranged in a cage-like cylinder having no central shaft, adhesion of a polymer to stirring vane-attaching portions is reduced, but since there is no central shaft, any increase in the rotation speed is restricted by the structural strength limits. Accordingly, renewal of the surface by shearing a thin film polymer is unsatisfactory, and it is difficult to greatly increase the reaction speed.

(C) As a means for eliminating dead spaces, there has been proposed a mechanism making an epicyclic movement, as disclosed in Japanese Examined Patent Publication No. 48-13240. However, this apparatus is defective in the following points.

(i) Since a vane is in contact with the wall, high-speed rotation is impossible and the reaction speed cannot be sufficiently increased.

(ii) Since the direction of revolution is the reverse of the direction of rotation, and the peripheral speeds counteract each other, and the reaction speed cannot be sufficiently increased.

(iii) Since many driving gears must be disposed and ball joints arranged in the reaction tank to maintain the wall-vane contact, the mechanism becomes complicated.

SUMMARY OF THE INVENTION

Under this background, we made research with a view to preparing a polyester having a good quality at a low cost by melt polymerization using a thin film polymerization tank while obtaining a high reaction speed and controlling decomposition without the formation of foreign substances in dead spaces, and as the result, we succeeded in developing a process for preparing a polyester by melt polymerization at a high polymerization speed, and thus completed the present invention.

More specifically, in accordance with one aspect of the present invention, there is provided a process for preparing a polyester by continuous melt polymerization, wherein a thin film polymerization apparatus having at least one columnar or cylindrical roller-shaped stirring vane rotating along and in close proximity to a substantially cylindrical vertical tank wall is used, and the stirring vane is caused to make an epicyclic movement along the tank wall in the circumferential direction thereof so that the direction of rotation is the same as the direction of revolution, and a polyester-forming monomer and/or an oligomer thereof is dropped on the surface of the tank wall in the form of a thin film.

In accordance with another aspect of the present invention, there is provided an apparatus for the preparation of a polyester, which comprises a thin film polymerization tank having at least one columnar or cylindrical roller-shaped stirring vane rotating along and in close proximity to a substantially cylindrical vertical tank wall, wherein, in the upper portion of the tank, a circumscribed type main gear, an upper disk, and a lower disk are arranged, in this order from above, a main driving shaft is disposed to pierce through the centers of the main gear, upper disk, and lower disk, the main driving shaft is freely fitted to the main gear, at least one of the upper and lower disks is secured to the main driving shaft, at least one supporting shaft is vertically rotatably disposed on the upper and lower disks, and an epicyclic gear to be engaged with the main gear is attached to the top end portion of the supporting shaft and the stirring vane is disposed in the lower portion of the supporting shaft.

The present invention is characterized in that in carrying out continuous polymerization by introducing a polyester-forming monomer and/or an oligomer thereof into a longitudinal reaction vessel heated and maintained under vacuum, a columnar or cylindrical roller-shaped stirring vane is caused to make an epicyclic movement along the tank wall in the circumferential direction thereof so that the direction of rotation is the same as the direction of revolution, whereby a thin film is formed on the tank wall and stirring vane. If this the peripheral speed of the sum of the rotation speed and revolution speed of the stirring vane to the tank wall is at least 0.3 m/sec and the clearance between the tank wall and the stirring vane is not larger than 5 mm, preferably 0.5 to 5 mm, effective shearing can be imparted to a polymer present between the tank wall and the stirring vane at a high speed, and the reaction can be greatly increased and the stirring vane is entirely wetted to substantially completely prevent the formation of dead spaces.

In order to impart a polymer-feeding function to the stirring vane, it is preferred that a rake-down groove structure be formed on the stirring vane. However, where a monomer or oligomer having an extremely low melt viscosity is reacted, a groove having a rake-up structure can be formed.

If the clearance between the tank wall and the stirring vane is broadened in the downstream high-viscosity region, the stirring power can be reduced and, simultaneously, the durability of the bearing as the stirring vane-supporting member, which has a relatively short life, can be greatly improved. In this embodiment, preferably a stirring vane having an inverted cone shape is used and the clearance between the stirring vane and the tank wall is 0.5 to 5 mm in the upper portion and 1 to 10 mm in the lower portion.

In order to control the incorporation of foreign substances (composed mainly of deteriorated polymers) into the formed polyester, preferably an opening for introducing an inert gas from above the lower disk is disposed, a plurality of inert gas flow-in holes formed through the lower disk, and a plate-like baffle disposed below and in close proximity to the flow-in holes so that the inert gas flows out and diffuses along the lower face of the lower disk. According to this embodiment, formation of a deteriorated polymer owing to the contact with and adhesion of a formed polymer to the lower face of the disk and residence of the polymer thereon can be effectively prevented.

DESCRIPTION OF THE PREFERRED EMBODIMENTS

The polyester referred to in the present invention is mainly directed to polyethylene terephthalate obtained by subjecting terephthalic acid or a dialkyl ester of terephthalic acid (the carbon number of the alkyl group is ordinarily 1 to 4) and ethylene glycol to esterification or transesterification reaction and polycondensation. However, a part (ordinarily up to 20 mole%) of terephthalic acid or the dialkyl ester of terephthalic acid may be substituted by a hydroxycarboxylic acid, for example, an aromatic dicarboxylic acid such as isophthalic acid, phthalic acid or naphthalene-dicarboxylic acid or an aliphatic dicarboxylic acid such as adipic acid or sebacic acid, or an alkyl ester thereof. Furthermore, a part or all of ethylene glycol may be substituted by a glycol represented by the formula $HO(CH_2)_nOH$ (in which $n$ is an integer of from 3 to 10), such as propylene glycol or tetramethylene glycol.

In the present invention, a manganese compound, a zinc compound or a magnesium compound is used as the ester exchange catalyst. However, the kind of the ester exchange catalyst is not particularly critical and any of compounds having an ester exchange capacity can be used. For example, inorganic compounds such as halides and oxides and organic acid salts are used. An organic acid salt such as an acetic acid salt, a propionic acid salt, a salicylic acid salt or a benzoic acid salt is preferably used.

The present invention will now be described in detail with reference to the accompanying drawings.

Figure 1:
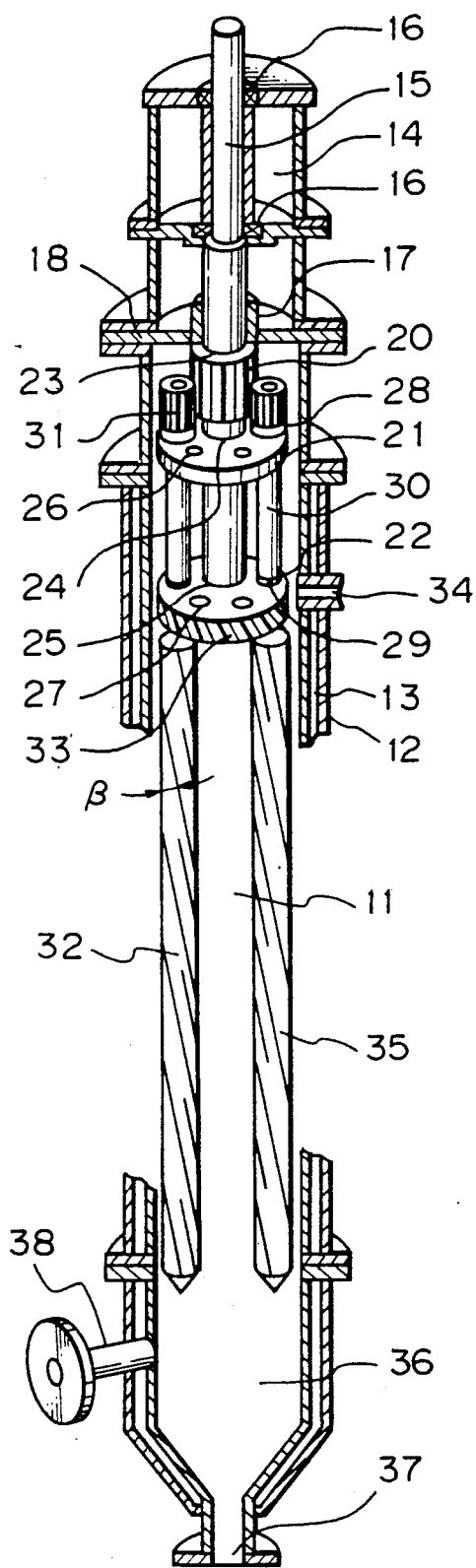
FIG. 1 is a perspective sectional view illustrating an embodiment of the polymerization apparatus according to the present invention.
Figure 2:
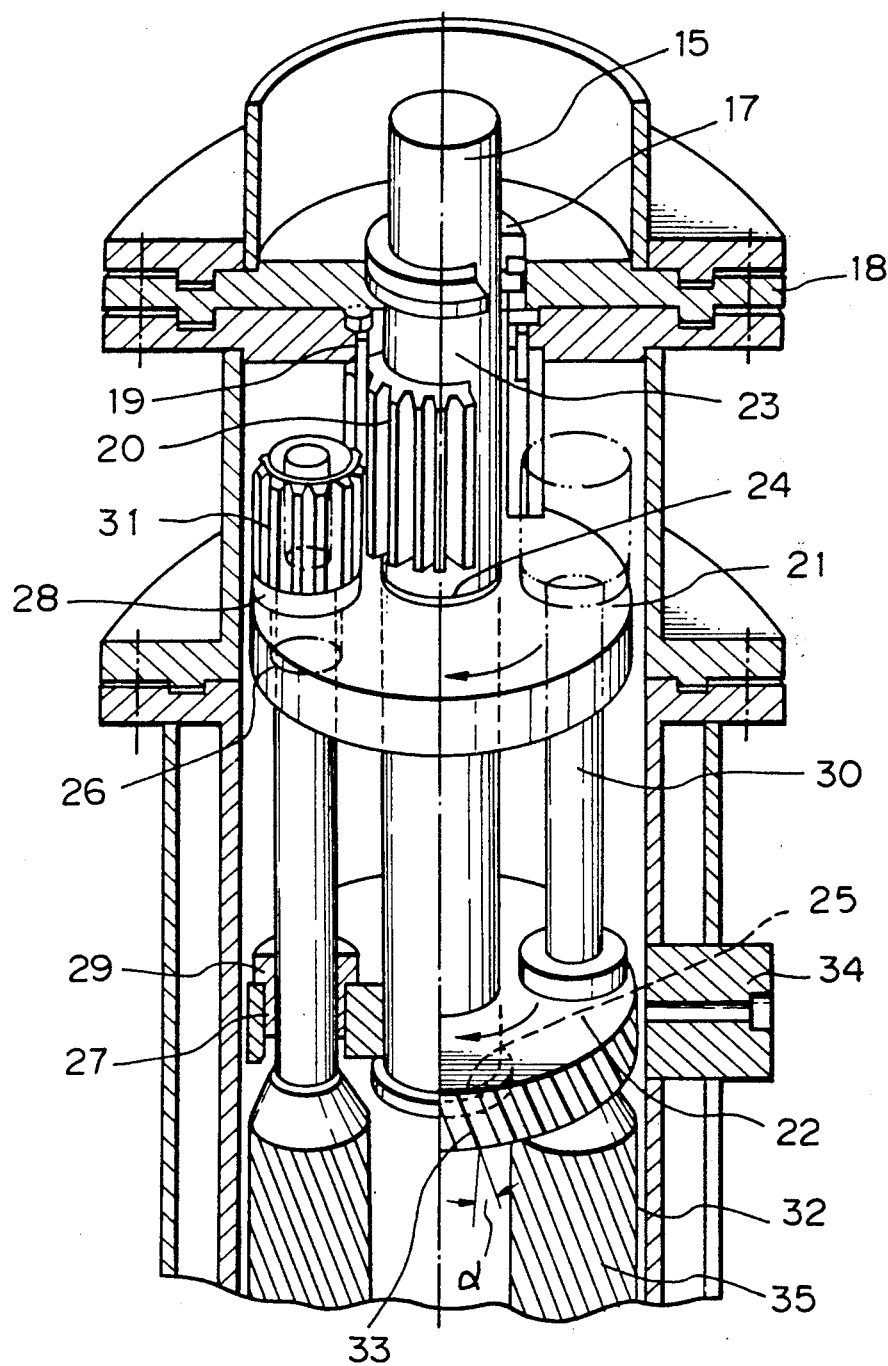
FIG. 2 is an enlarged perspective view showing a driving mechanism of the apparatus shown in FIG. 1.

Referring to FIGS. 1 and 2, a cylindrical tank 11 has a shaft sealing chamber 14 in the upper portion and a withdrawal chamber 36 in the lower portion, and substantially all of the periphery of the tank 11 is surrounded by an outer cylinder 12 and a heating jacket chamber 13 is formed between the tank 11 and the outer cylinder 12. A driving shaft 15 piercing through the central portion is rotatably supported in the shaft sealing chamber 14 through a bearing 16, and the top end of the driving shaft 15 is connected to a driving member directly through a pulley (not shown) or the like. Sealing means 17 such as a mechanical seal is disposed on the lower end of the shaft sealing chamber 14 to seal the tank 11 so that it can resist high vacuum.

In the upper portion of the tank 11, a stationary main gear 20 secured to a partition plate 18 through a bolt 19 or the like and upper and lower disks 21 and 22 having a size such that they are in close proximity to the inner wall of the tank 11 are arranged, in this order from above, at predetermined intervals. Through holes 23, 24, and 25 are formed in the main gear 20 and the upper and lower disks 21 and 22, respectively, and the driving shaft 15 pierces these through holes 23 to 25 and the lower end of the driving shaft 15 reaches the lower disk 22 (the driving shaft 15 may also pierce through the lower disk 22). The driving shaft 15 has no contact with the main gear 20 but pierces the main gear 20 in the freely fitted state. The upper and lower disks 21 and 22 are secured and integrated by a key or the like (not shown). Preferably this fixation is carried out for both of the upper and lower disks 21 and 22, but only one need be fixed, if desired.

A plurality of through holes 26 or 27 (6 holes formed equidistantly in FIG. 1) are formed in each of the upper and lower disks 21 and 22. A supporting shaft 30 is rotatably held through these through holes 26 and 27 via bearings 28 and 29 arranged in the through holes 26 and 27. An epicyclic gear 31 to be engaged with the main gear 20 is secured to the top end of the supporting shaft 30, and a columnar roller-shaped stirring vane 32 is connected to the lower portion of the supporting shaft 30 below the lower disk 22, so that the stirring vane 32 is in close proximity to the inner wall of the tank. In order to maintain a good balance, at least two stirring vanes 32 (supporting shafts 30) are equidistantly disposed, but only one stirring vane need be disposed, if desired.

Many convex-concave inclined grooves 33 are formed on the side periphery of the lower disk 22, and a reaction liquid feed nozzle 34 is arranged on the inner wall of the tank at the position confronting the side periphery of the lower disk 22, so that a reaction liquid fed from the feed nozzle 34 abuts against the concave-convex side periphery of the lower disk 22 and is thus dispersed. Accordingly, the lower disk 22 acts as a polymer-dispersing member.

The oblique grooves (convex-concave parts) 33 for dispersing the polymer are formed so that a downward force is given to the reaction liquid according to rotation, and the angle $\alpha$ is preferably 10° to 30°.

Ordinarily, a spiral groove 35 is formed along the entire circumference of the stirring vane 32 so as to produce a downward feed action. However, where the viscosity of the reaction liquid is low, a spiral groove extending in a reverse direction so as to perform a rake-up action may be formed. In an ordinary case, in order to attain effective surface-renewing and rake-down (rake-up) actions, the spiral groove 35 (or the concave part) is formed so that the angle $\beta$ to the vertical line is preferably 8° to 40°, especially preferably 10° to 30°. Preferably the groove 35 is discontinuous rather than continuous. For example, preferably the groove 35 is discontinuous with a length corresponding to about 1.5 circumferences.

The stirring vane 32 is arranged so that it can rotate in close proximity to the inner wall of the tank, and the distance between the stirring vane 32 and the inner wall of the tank, that is, the clearance between the outer diameter (the convex part in the case where the groove 35 is formed) of the stirring vane 32 and the inner wall of the tank is not larger than 5 mm, preferably 0.5 to 5 mm, especially preferably 0.5 to 3 mm. If this clearance exceeds 5 mm, short paths are readily formed, the reaction speed is not increased, and dead spaces are likely to be formed. If the clearance is smaller than 0.5 mm or the stirring vane 32 is always in contact with the inner wall of the tank, the stirring resistance is increased and a peripheral speed suitable for imparting an effective shearing action to the reaction liquid can not be given to the reaction liquid. In order to impart an especially effective shearing action to the reaction liquid and increase the reaction speed by promoting mixing, preferably the stirring vane is caused to make an epicyclic movement such that the direction of rotation is the same as the direction of revolution, and the peripheral speed of the stirring vane, that is, the sum of the rotation speed and revolution speed, is at least 0.3 m/sec, especially at least 0.5 m/sec. If an epicyclic movement is carried out at a peripheral speed lower than 0.3 m/sec, the reaction is not sufficiently advanced and it is often impossible to stably obtain a product having an excellent quality.

The reaction liquid withdrawal chamber 36 located in the lower portion of the tank 11 has a reaction liquid withdrawal nozzle 37 arranged on the lower end thereof and a vacuum suction nozzle 38 arranged in the side portion thereof.

In the apparatus having the above-mentioned construction, when the driving shaft 15 is rotated by driving means (not shown), the upper and lower disks 21 and 22 are rotated in the direction indicated by an arrow. By this rotation, the epicyclic gear 31 is engaged with the main gear 20, and the epicycle gear 31 revolves around the main gear 20 and rotates around its own axis. Accordingly, the stirring vane 32 makes an epicyclic movement in close proximity to the inner wall of the tank along the inner wall of the tank such that the direction of rotation is the same as the direction of revolution.

The tank 11 and withdrawal chamber 36 are heated at a predetermined temperature by heating means such as a heating medium in the jacket 13, and simultaneously, a high vacuum is maintained in the tank 11 and withdrawal chamber 36 through the nozzle 38 communicating with a vacuum generating means. The reaction liquid (monomer, prepolymer or polymer) supplied from the nozzle 34 arranged in the upper portion of the tank is distributed substantially uniformly in the circumferential direction by the lower disk 22 and is coated on the inner wall of the tank.

The polymer flows down while receiving a shearing action from the stirring vane 32 revolving and rotating in the same direction as the revolution direction. Thus, the polymer coated on the inner wall of the tank always moves downward in the state where the surface is always renewed and undergoes effective shearing by the clearance between the stirring vane and the wall face. Surface renewal is very rapidly effected in the polymer present on the surface of the stirring vane 32 to form a filmy reaction surface, and the reaction is advanced very rapidly.

As is well-known, in the polycondensation reaction of a polymer, a diol (ethylene glycol in case of a polyester) as a reactant in the polymer diffuses at a controlled velocity. However, if the above-mentioned mechanism is adopted, a big increase in the reaction speed can be attained.

Figure 8:
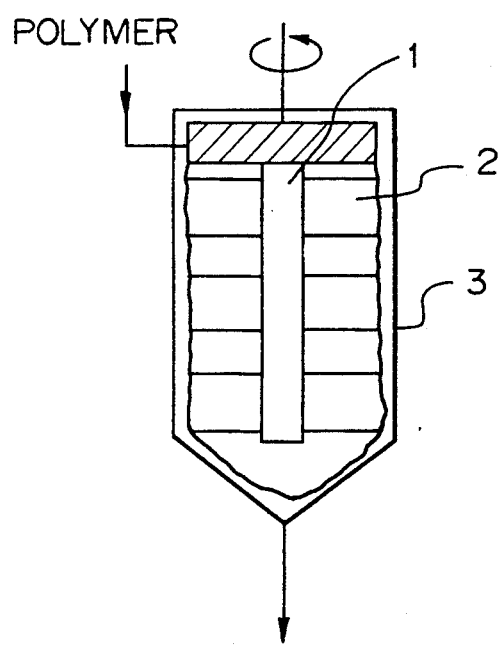

Another merit of the present invention is that the vane is entirely wetted and a so-called dead space is not formed. For example, in the case of a reaction vessel 3 having a central shaft 1 and a stirring vane 2 attached thereto as shown in FIG. 8, a thin film polymer is obtained, but the shaft 1 and a base portion to which the stirring vane 2 is attached are not wetted with the polymer and so-called dead spaces are formed, and materials scattered to these dead spaces are converted to gel-like foreign substances with the lapse of time.

Figure 3:
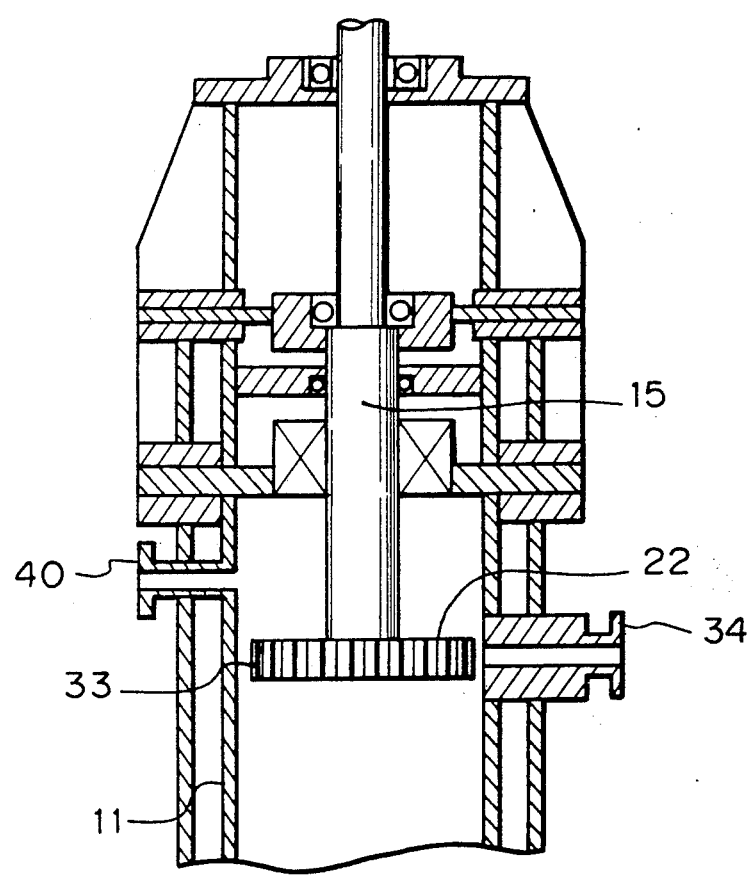
FIG. 3 is a sectional view showing a main part of another embodiment of the apparatus of the present invention.
Figure 4:
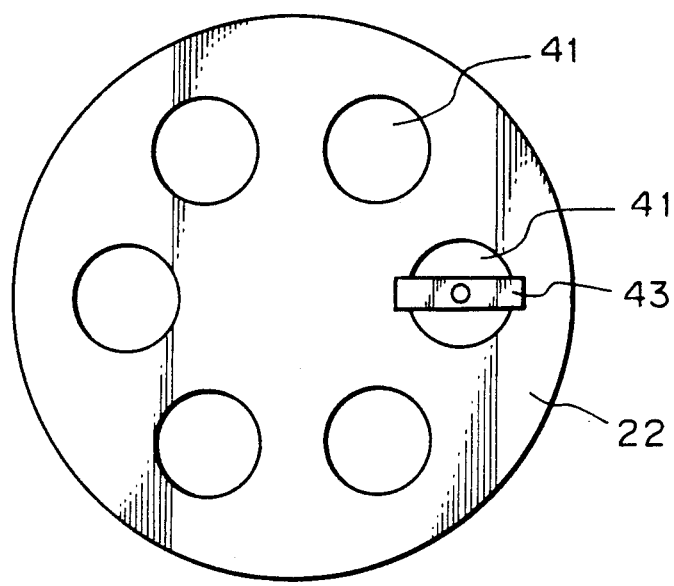
FIG. 4 is a plan view showing a lower disk of the apparatus shown in FIG. 3.
Figure 5:
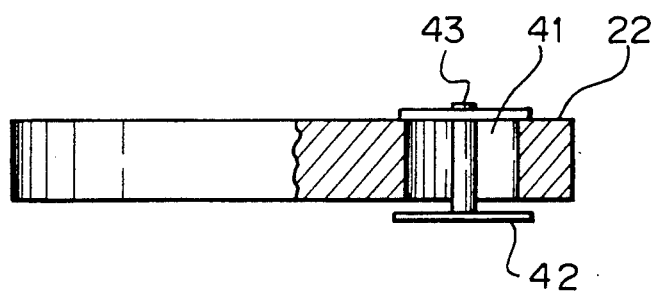
FIG. 5 is a partially sectional side view showing a main part of the disk shown in FIG. 4.

Preferably, the reaction liquid is fed from the position confronting the lower disk 22 and dispersed around the periphery of the lower disk 22. In this case, however, a part of the scattered or evaporated reaction liquid adheres to the lower face of the lower disk 22, and a deteriorated polymer is often formed. In order to eliminate this disadvantage, it is preferred that an inert gas, ordinarily nitrogen gas, should flow on the lower face of the lower disk 22 to cover the lower face of the lower disk. In this case, adhesion of the reaction liquid to the lower face of the lower disk 22 can be prevented and the formation of a deteriorated polymer can be avoided. A specific example of this means will now be described with reference to FIGS. 3 through 5. In FIGS. 3 through 5, parts irrelevant to this means are omitted to simplify the illustration. Referring to FIGS. 3 through 5, a nitrogen gas supply nozzle 40 is disposed in the tank 11 above the lower disk 22, and nitrogen gas is supplied into the tank 11 through this nozzle 40 from a nitrogen gas supply source (not shown). As shown in FIGS. 4 and 5, a plurality of holes 41 are formed at substantially equal pitches in the disk 22 to pierce through the disk 22 in the vertical direction. A disk-like baffle 42 having a size slightly larger than the hole 41 is attached on the lower side of each hole 41 in close proximity thereto. Accordingly, the nitrogen gas fed from the supply nozzle 40 is allowed to diffuse and flow out along the lower face of the lower disk 22. The distance between the baffle 42 and the lower face of the lower disk 22 is preferably 0.1 to 5 mm, and preferably, the flow speed of the nitrogen gas is adjusted to 5 to 40 m/sec. Note, reference numeral 43 represents a vertical attachment to which the baffle 42 is attached. When the reaction liquid is supplied in the tank maintained under a high vacuum, the reaction liquid is splashed and scattered downward. However, in this embodiment, since the lower face of the lower disk 22 is substantially completely covered with the inert gas, the reaction liquid does not adhere to the lower disk and the formation of gel-like or solid foreign substance can be prevented, and therefore, a product having an excellent quality can be stably prepared. Note, in view of the uniform dispersion of the reaction liquid, preferably a plurality of holes 41 are formed at equal pitches seen from above, as shown in FIG. 4, although the present embodiment is not limited to this feature. The holes 41 may be formed not only in the outer peripheral portion but also in the central portion.

Figure 6:
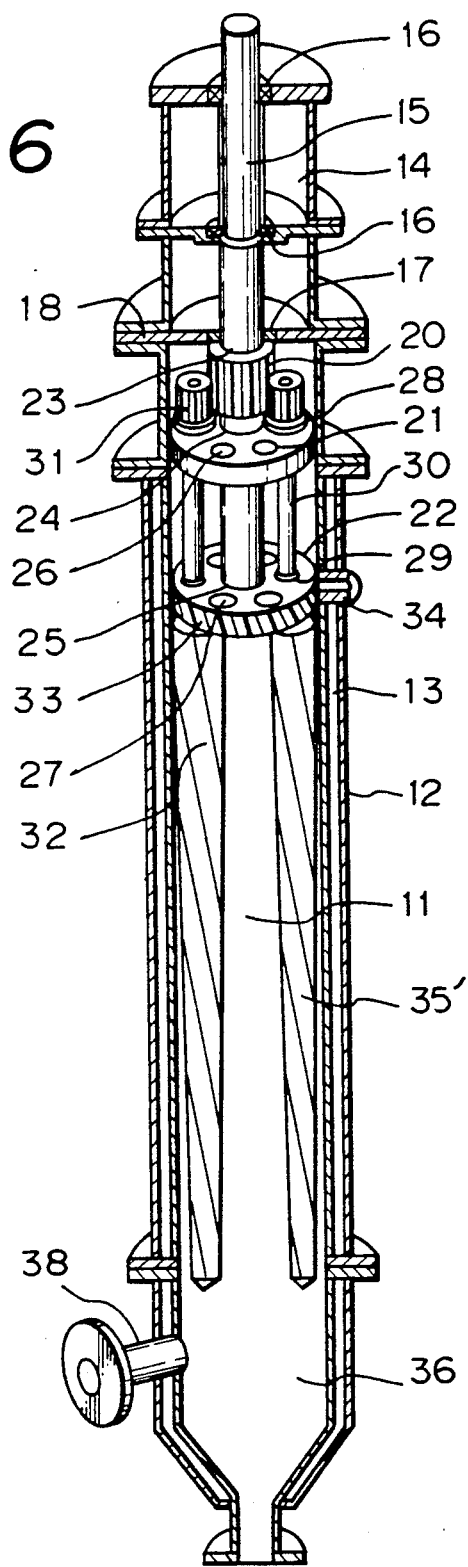
FIG. 6 is a perspective sectional view showing still another embodiment of the apparatus of the present invention.

FIG. 6 illustrates an embodiment in which a labor-saving effect is attained and the life of the bearing is prolonged. Referring to FIG. 6, a stirring vane 35' of an inverted cone shape in which the size is continuously reduced downward is disposed, but other members are substantially the same as those shown in FIG. 1 and are indicated by the same reference numerals as used in FIG. 1.

It is preferred that a plurality of through holes 26 or 27, especially at least 3 through holes, especially particularly 4 to 6 through holes, be formed on each of the upper and lower disks 21 and 22 so that stirring vanes 32 can be exchanged or the number of stirring vanes 32 can be changed to change reaction factors (the difference of the viscosity between the inlet polymer and the outlet polymer, the production rate and the like). In this case, the flexibility of the reaction factors can be increased in the apparatus of the present invention over the flexibility of the conventional apparatus having the same tank size. When the through holes 26 and 27 are not used, they are ordinarily blocked by blind patches, but they may be kept open.

The present invention will now be described with reference to the following examples directed to polyethylene terephthalate as a typical thermoplastic polymer, that by no means limit the scope of the invention.

Note, the intrinsic viscosity $[\eta]$ is calculated from the viscosity as measured at 35° C. in o-chlorophenol as the solvent.

EXAMPLE 1

Figure 7:
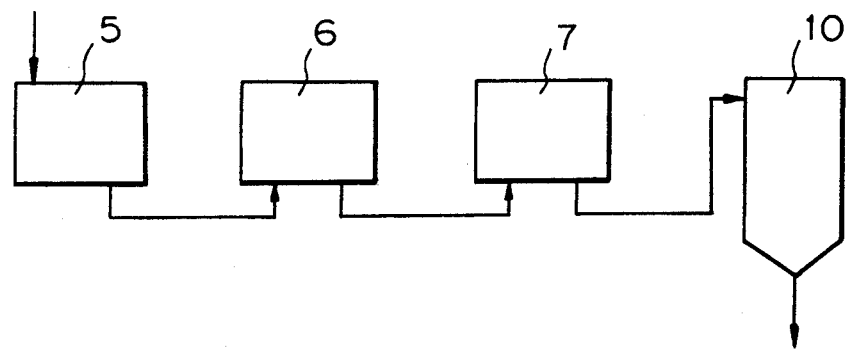
FIG. 7 is a flow diagram illustrating an embodiment of the process of the present invention; and, FIG. 8 is a diagram illustrating the conventional apparatus.

In a continuous transesterification reaction tank 5 shown in FIG. 7, 280 parts/hour of dimethyl terephthalate (DMT) and 280 parts/hour of ethylene glycol (ET) were continuously fed together with manganese acetate in an amount of 0.05 mole % based on DMT and zinc acetate in an amount of 0.01 mole % based on DMT, and a transesterification reaction was carried out under heating at 150 to 250° C. while removing methanol by distillation. The residence time was 6 hours.

To the obtained transesterification reaction product were added phosphoric acid in an amount of 0.1 mole % based on DMT and antimony trioxide in an amount of 0.03 mole % based on DMT as the polymerization catalyst, and the mixture was continuously fed into an initial polymerization tank 6 and reaction was conducted at 50 mmHg and 260° C. for 1 hour to obtain a polymer having $[\eta]$ of 0.15. The obtained molten reaction product was fed into an intermediate polymerization tank 7 and reacted at 5 mmHg and 280° C. for 2 hours to obtain a polymer having $[\eta]$ of 0.5. Then, the polymer was fed into a thin film polymerization tank (apparatus) 10 as shown in FIG. 1 and reacted at 1 mmHg and 300° C. for 2 minutes to obtain a polymer having $[\eta]$ of 1.0 and a terminal carboxyl group concentration of 13 eq/T.

In the thin film polymerization tank, two stirring vanes having a spiral groove having a depth of 2 mm were arranged for raking down the polymer. The direction of rotation was the same as the direction of revolution, and the peripheral speed corresponding to the sum of the rotation speed and revolution speed was adjusted to 0.5 m/sec. The clearance between the stirring vane and the tank wall was 2 mm. When the operation was conducted continuously for 1 month and the apparatus was disassembled and checked, it was found that no dead spaces were formed on the vanes.

COMPARATIVE EXAMPLE 1

According to the same process (FIG. 7) as in Example 1, the operation was carried out. An inscribed gear type epicyclic mechanism disclosed in Japanese Examined Patent Publication No. 48-13240 was adopted as the stirring vane driving mechanism in the polymerization tank. The directions of rotation and revolution were reversed, but other conditions (reaction conditions, the stirring vane rotation number and the like) were the same as in Example 1. The rotation speed was higher than the revolution speed and the total peripheral speed of the stirring vane was 0.05 m/sec, but an effective stirring could not be obtained, and $[\eta]$ was increased only to 0.60 and a sufficient reaction speed could not be obtained. Even if the rotation speed was increased to the upper limit of the apparatus capacity, the total peripheral speed of the stirring vane did not exceed 0.15 m/sec, and a polymer having $[\eta]$ larger than 0.64 could not be obtained.

COMPARATIVE EXAMPLE 2

According to the same process (FIG. 7) as in Example 1, the operation was carried out by using a reaction tank having a stirring vane attached to a central shaft, as shown in FIG. 8. The peripheral speed of the vane was adjusted to 0.5 m/sec as in Example 1.

In this case, the reaction surface area was smaller than ½ of the reaction surface area in Example 1, and $[\eta]$ of the obtained polymer did not exceed 0.65 and a sufficient reaction speed could not be obtained.

When the operation was conducted for 1 month, the incorporation of gel-like foreign substances in the polymer was observed. When the apparatus was disassembled and checked, it was found that gel-like foreign substances adhered to the central shaft and the root portion of the vane, and dead spaces were formed.

EXAMPLE 2

By using a thin film polymerization tank as shown in FIG. 6, a polymer having [η] of 1.0 and a terminal carboxyl group concentration of 13 eq/T was prepared under the same conditions as adopted in Example 1.

Two stirring vanes having a spiral groove having a depth of 2 mm for raking down the polymer were attached in the thin film polymerization tank shown in FIG. 6. The direction of rotation was the same as the direction of revolution, and the peripheral speed corresponding to the rotation speed and revolution speed was 0.5 m/sec. The clearance between the stirring vane and the tank wall was 1 mm in the upper portion and 7 mm in the lower portion. That is, the stirring vane had an inverted cone shape in which the clearance was gradually increased downward. When the operation was continuously conducted for 2 months and the apparatus was disassembled and checked, it was found that no dead space was formed on the vanes. The power consumption of the agitation vane was smaller by about 15% than that of a conventional straight stirring vane (the clearance was 2 mm).

EXAMPLE 3

A polymer having the same properties as those of the polymer obtained in Example 1 was prepared under the same conditions as those adopted in Example 1 except that a nitrogen supply means as shown in FIGS. 3 through 5 was attached to the thin film polymerization vessel. When the operation was continuously conducted for 6 months and the apparatus was disassembled and checked, it was found that no dead space was formed on the stirring vane or the lower face of the lower disk. When the operation was continuously conducted for about 1 year and the apparatus was checked, it was found that a deteriorated polymer adhered to a part of the lower face of the lower disk, but the quality of the product was not influenced by the presence of this deteriorated polymer.

As is apparent from the foregoing description, according to the present invention, the reaction speed can be made much higher than in the conventional thin film polymerization tank, and formation of foreign substances, especially gel-like foreign substances, by dead spaces, can be prevented and a polymer having a good quality can be obtained stably. Furthermore, since the reaction speed is very high, a polyester having a very low terminal carboxyl group concentration and a good polymerization degree can be obtained. This polyester is very valuable for fibers, films and other shaped articles.

We claim:

1. An apparatus for the preparation of a polyester, which comprises a thin film polymerization tank having a substantially cylindrical roller-shaped stirring vane rotating along and in close proximity to said substantially cylindrical vertical tank wall, wherein in the upper portion of the tank, a circumscribed type non-rotatable mesh gear, an upper disk and a lower disk are arranged in this order from above, a mesh driving shaft is disposed to pierce through the center of the main gear, upper disk and lower disk, the main driving shaft is freely rotatable within the main gear, at least one of the upper and lower disks is secured to the main driving shaft, at least one supporting shaft is vertically rotatably disposed on the upper and lower disks, and an epicyclic gear in meshing engagement with the main gear is attached to the top end portion of the supporting shaft and said a stirring vane is disposed on the lower portion of the supporting shaft such that the main driving shaft rotates the stirring vane in a first rotational direction about said cylindrical vertical tank wall through said at least one of the upper and lower disks secured to the main driving shaft and the main driving shaft also rotates the stirring vane about its own axis in the same first rotational direction through the at least one of the upper and lower disks secured to the main driving shaft, said epicyclic gear in meshing engagement with the main gear and the supporting shaft.

2. An apparatus as set forth in claim 1, wherein the clearance between the tank wall and the stirring vane is not larger than 5 mm.

3. An apparatus as set forth in claim 1, wherein a rake-down or rake-up spiral groove is formed on the stirring vane.

4. An apparatus as set forth in claim 3, wherein the stirring vane has an inverted cone shape.

5. An apparatus as set forth in claim 1, wherein a reaction liquid feed opening is formed on the tank wall at a position confronting the lower disk and an inclined groove for dispersing a reaction liquid is formed on the entire peripheral face of the lower disk.

6. An apparatus as set forth in claim 5, wherein said lower disk rotates in a rotation direction and the inclined groove is formed in the lower disk at an angle of 10° to 30° to the vertical direction to extend in a direction reverse to the rotation direction of the lower disk.

7. An apparatus as set forth in claim 5, wherein means defining an inert gas introduction opening is formed above the lower disk, means defining a plurality of inert gas flow holes are formed in the lower disk, and a plate-like baffle is formed below and in close proximity to the flow holes so that the inert gas flows along the lower face of the lower disk.

8. An apparatus as set forth in claim 3, wherein the spiral groove is discontinuous and extended at an angle of 10° to 30° to the vertical direction.

* * * * *